United States Patent
Jaggars et al.

(10) Patent No.: US 10,402,368 B2
(45) Date of Patent: Sep. 3, 2019

(54) CONTENT AGGREGATION FOR UNSTRUCTURED DATA

(71) Applicant: Red Hat, Inc., Raleigh, NC (US)

(72) Inventors: Jesse Jaggars, Little Rock, AR (US); Christopher Sams, Little Rock, AR (US); Michael Clark, Little Rock, AR (US); Kyle Lape, Austin, TX (US)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 15/398,310

(22) Filed: Jan. 4, 2017

(65) Prior Publication Data

US 2018/0189299 A1    Jul. 5, 2018

(51) Int. Cl.
*G06F 17/30* (2006.01)
*G06F 16/11* (2019.01)
*G06F 16/13* (2019.01)
*G06F 16/33* (2019.01)
*G06F 16/84* (2019.01)

(52) U.S. Cl.
CPC ............ *G06F 16/116* (2019.01); *G06F 16/13* (2019.01); *G06F 16/334* (2019.01); *G06F 16/84* (2019.01)

(58) Field of Classification Search
CPC ........... G06F 17/30076; G06F 17/2705; G06F 17/30091; G06F 17/30675
USPC ........................................................ 707/755
See application file for complete search history.

(56) References Cited

U.S. PATENT DOCUMENTS

| | | | |
|---|---|---|---|
| 7,266,537 B2 | 9/2007 | Jacobsen et al. | |
| 7,584,422 B2 | 9/2009 | Ben-Yehuda et al. | |
| 7,730,396 B2 | 6/2010 | Chidlovskii et al. | |
| 7,941,706 B2 | 5/2011 | Yuasa et al. | |
| 7,945,545 B1* | 5/2011 | Sorkin | G06F 17/30884 707/705 |
| 8,442,999 B2 | 5/2013 | Gorelik et al. | |
| 8,700,682 B2 | 4/2014 | Tedder et al. | |
| 8,751,486 B1* | 6/2014 | Neeman | G06F 17/30908 707/722 |
| 2005/0108256 A1* | 5/2005 | Wakefield | G06F 17/30569 |
| 2005/0108295 A1* | 5/2005 | Karimisetty | G06F 17/30938 |
| 2010/0161616 A1* | 6/2010 | Mitchell | G06F 17/30613 707/741 |
| 2010/0250598 A1* | 9/2010 | Brauer | G06F 17/30622 707/780 |

(Continued)

OTHER PUBLICATIONS

Agrawal et al., "Challenges and Opportunities with Big Data," https://www.purdue.edu/discoverypark/cyber/assets/pdfs/BigDataWhitePaper.pdf, 17 pages, Nov. 2011-Feb. 2012.

(Continued)

*Primary Examiner* — Hung T Vy
(74) *Attorney, Agent, or Firm* — Lowenstein Sandler LLP

(57) ABSTRACT

A mechanism for extracting system characteristics from an unstructured data format, a semi-structured data format, or a structured data format is disclosed. A processing device may receive information associated with a computing system in an unstructured data format. A content type of the information in the unstructured data format may be determined. A parser corresponding to the content type may be identified. A system characteristic from the information in the unstructured data format may be extracted using the parser. The extracted system characteristic may be stored in a common format.

22 Claims, 7 Drawing Sheets

(56) References Cited

U.S. PATENT DOCUMENTS

| | | | |
|---|---|---|---|
| 2011/0145246 A1* | 6/2011 | Prager | G06F 17/30011 |
| | | | 707/737 |
| 2014/0156711 A1* | 6/2014 | Sharan | G06F 17/30294 |
| | | | 707/804 |
| 2014/0283048 A1* | 9/2014 | Howes | G06F 17/30864 |
| | | | 726/23 |
| 2015/0081396 A1 | 3/2015 | Miller | |
| 2015/0301996 A1* | 10/2015 | Hinterbichler | G06F 11/3656 |
| | | | 715/230 |
| 2016/0132572 A1* | 5/2016 | Chang | G06F 17/30569 |
| | | | 707/723 |
| 2017/0004415 A1* | 1/2017 | Moretti | G09B 5/00 |

OTHER PUBLICATIONS

Mysore et al., "Big Data Architecture and Patterns, Part 4: Understanding Atomic and Composite Patterns for Big Data Solutions," http://www.ibm.com/developerworks/library/bd-archpatterns4/, 14 pages, Nov. 26, 2013.

Gandomi et al., "Beyond the Hype: Big Data Concepts, Methods, and Analytics," http://www.sciencedirect.com/science/article/pii/S0268401214001066, 8 pages, Dec. 3, 2014.

* cited by examiner

| | |
|---|---|
| 310 — Type of central processing unit (CPU) | 322 |
| 312 — A number of processing cores | 324 |
| 314 — A number of hard disks | 326 |
| 316 — A size of hard disks | 328 |
| 318 — A type of random access memory (RAM) | 330 |
| 320 — A size of RAM | 332 |

CONTENT AGGREGATION FOR UNSTRUCTURED DATA

TECHNICAL FIELD

Aspects of the present disclosure are generally related to computing systems, and more particularly to data format integration.

BACKGROUND

Vast amounts of information are stored by computing systems. However, access to the data across the computing systems is not always possible. Some computing systems are legacy systems, which are self-contained and which have little or no flexibility in terms of data output and communication. Other computing systems rely on proprietary data formats and may lack flexibility for interoperability or data integration between systems.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 illustrates a data structure to store structured data, unstructured data, or semi-structured data in FIG. 2 in a common format according to one example.

DETAILED DESCRIPTION

Figure 1:
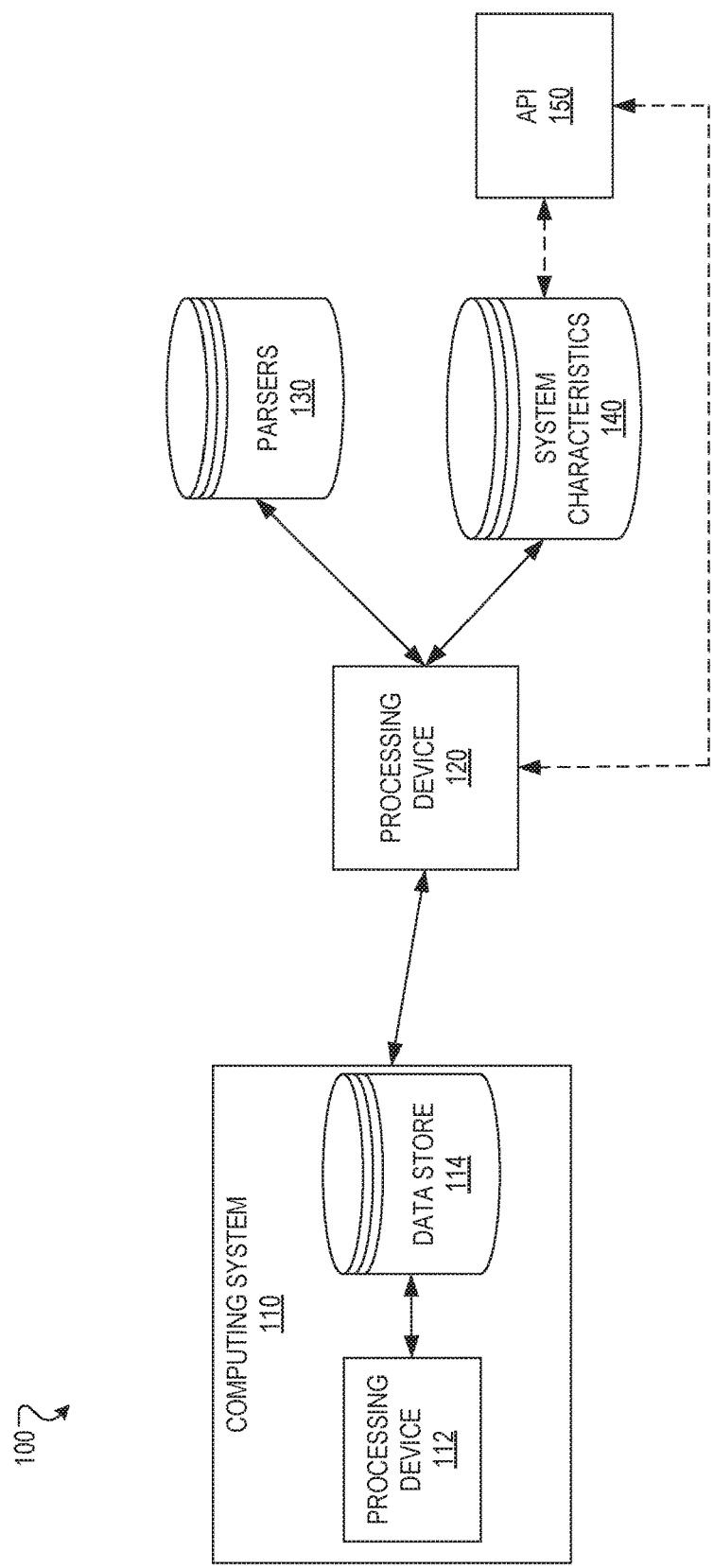
FIG. 1 depicts a system to aggregate unstructured data, semi-structured data, and structured data into a common format according to one example.

When encountering an error or upon receiving a request, a customer device may provide system characteristics to a processing device, such as via an archive file. The batch file may include a relatively large amount of structured data, unstructured data, or semi-structured data. The structured data may refer to data in a defined format that is at defined positions in the batch file. For example, the structured data at a defined position in the archive file may be in an extensible markup language (XML) format and may be parsed to extract information.

The unstructured data may refer to data for a computing system that is in a human readable format, such as a text or spreadsheet file format. While the unstructured data may have an implicit format, a parser may not be able to identify and extract the information from data in the undefined format. The semi-structured data may refer to data with some portions of the data in the structured format and other portions of the data in the unstructured format. The unstructured data or the semi-structured data may be configuration files for a computing system, log files for the computing system, command output data for the computing system, and so forth. Because the parser may not be able to identify the location of different types of information in the undefined format, the parser may not be able to parse and extract information from the unstructured data or the semi-structured data. For example, a log file for a computing system may be in an undefined spreadsheet format with fields that are not defined as storing specific types of information. The parser may not be able to parse and extract information from the data in the undefined spreadsheet format because the parser cannot locate specific types of information in the undefined spreadsheet format.

To analyze the unstructured data and the semi-structured data, an analyst may have to manually parse and extract the data to gather the information. As the amount of unstructured data and semi-structured data in a batch file increases, the data preparation work performed by an analyst may account for an increasingly large percentage of their analysis time and may introduce errors into the information as the analyst manually parses the data.

Aspects of the present disclosure overcome this and other deficiencies by transforming unstructured data, semi-structured data, and structured data into a common format. The formats of the unstructured data, semi-structured data, and structured data between different systems (such as operating systems) may vary. To parse the same unstructured data, semi-structured data, and structured data for the different systems, different parsers may be used to parse and extract information from the unstructured data, the semi-structured data, and the structured data. For example, a parser may be selected in view of a type of content corresponding to the data and the selected parser may be used to extract information from the data. When information is extracted from the unstructured data, the semi-structured data, and the structured data, the information may be stored in a common format for analysis.

One advantage of transforming the unstructured data, the semi-structured data, and the structured data into a common format may be to reduce or eliminate errors based on a misunderstanding of the data by analysts, mistakes introduced by multiple parsing functions, and errors from manually formatting the unstructured data and semi-structured data. Another advantage of transforming information from the unstructured data, the semi-structured data, and the structured data may be to the aggregate the structured data, the unstructured data, and the semi-structured data into a common format. The common format may enable a user or an application to analyze information extracted from different sources and from data in different formats.

FIG. 1 depicts a system 100 to aggregate information from unstructured data, semi-structured data, and structured data into a common format according to one example. The system 100 may include a computing system 110 with a first processing device 112 and a data store 114, a second processing device 120, a database 130 to store parsers, a database 140 to store system characteristics, and an application program interface (API) 150. The computing system 110 may be a server, desktop computer, laptop computer, electronic tablet, smartphone, a personal digital assistant (PDA), a client device, or other electronic devices. The first processing device 112 of the computing system 110 may determine data associated with the computing system 110. The data may be in an unstructured data format, a semi-structured data format, or a structured data format. The data may be words, strings, characters, symbols, and so forth. In one example, when a system error occurs in the computing system 110, the first processing device 112 may gather the data associated with the computing system 110. The data may be a string of information. In one implementation, the first processing device 112 may store the data in the data store 114. In another implementation, the first processing device 112 may generate a batch file with the data associated with the computing system 110.

In one implementation, the second processing device 120 of another computing system may receive the batch file or the data stored at the data store from the computing system 110. For example, the computing system 110 may periodically send the data to the second processing device 120. In another implementation, in response to the system error, the computing system 110 may send the data, such as a case attachment, to the second processing device 120. A case attachment may be a file uploaded to support a customer service matter to address an issue with a product or service, such as an application. In another implementation, the second processing device 120 may periodically retrieve the data from the data store 114. In another implementation, the second processing device 120 may receive a request from a user device to retrieve the data from the data store 114. The data may include system configuration information, log information, or system activity information.

In response to receiving or retrieving the data, the second processing device 120 may determine a content type of the data. The content types may include system configuration information, log information, or system activity information. In one implementation, the second processing device 120 may determine the content type in view of an identifier in the data. In one example, the identifier indicates a file path of the data in a file system used by the computing system 110. The second processing device 120 may use a keyword in the file path or a location in memory where the data is stored to identify the content type. For example, a file path for data may be System\CurrentControlSet\Services\EventLog\Application folder. The keyword "EventLog" in the file path may indicate that the content type for data is an event log. The location "\EventLog\Applicationfolder" may indicate that the file is stored at a file path for an event log. In another implementation, the second processing device 120 may determine a content type of the data by parsing the data to extract a keyword and identifying a content type associated with the keyword. In one example, the keyword indicates that the string of information is received from a particular hardware component of the computing system. In another example, the second processing device 120 may determine a content type of the data by querying the string of information to identify interface configuration information indicating the content type of the data.

The second processing device 120 may identify a parser from a group of parsers stored in the database 130 that is associated with the content type for the data. The parser may be a program for parsing the data to extract defined information for the content type. The defined information may include system characteristics of the computing system 110. To identify the parser, the second processing device 120 may query the database 130 storing multiple parsers and identify a parser that has been associated with the content type.

The parser may identify system characteristics from the data that include, but are not limited to, a type of central processing unit (CPU) in the computing system 110, a number of processing cores in the computing system 110, a number of hard disks in the computing system 110, a size of the hard disks in the computing system 110, a type of random access memory (RAM) in the computing system 110, or a size of the RAM in the computing system 110.

For a parser associated with log information, the parser may extract system characteristics that include, but are not limited to, an access log listing all individual files requested from a website (such as HTML files and embedded graphic images), a number of visitors to a web domain, a number of requests for each page of a website, usage patterns of a website, transaction log records of changes made to the computing system 110, an indicator of a completion of a task, such as installation of an application, a warning event indicator of a prospective problem in the computing system 110, such as low disk space, an error message identifying a problem that may cause a decrease or loss of functionality in the computing system 110, a successful audit indicates a completion of an audited security event, such as an end user successfully logging on, or a failure audit event indicator identifying an audited security event that did not complete successfully, such as a user inputting an incorrect password into an input device. The event log may also include, but is not limited to, a date an event occurred; a time the event occurred, a username associated with a user who was logged into the computing system 110 when the event occurred, an identifier associated with the computing system, such as a computer name; an identification number that specifies an event type, a program or component in the computing system 110 that caused the event, or a type of event (information, warning, error, security success audit or security failure audit).

For a parser associated with system activity information, the parser may extract system characteristics, including, but not limited to, information indicating applications being executed by the computing system, information indicating applications not being executed by the computing system, records of activities that may have affected an operation of the computing system 110, a list of resources of the computing system 110 that were accessed by a user, or a timestamp and user login information for a user who accessed the resources.

The keywords, lines, characters, or strings used to identify system characteristics may vary between different types of data structures, such as structured data, unstructured data, and semi-structured data and content types for the data. To query for defined keywords, lines, characters, strings, and so forth that are associated with the different content types or data structures, the processing device 120 may use different parsers. In one implementation, a first parser may be associated with system configuration information for unstructured data and may query for keywords, lines, characters, and strings associated with system configuration information for the unstructured data. In another implementation, a second parser may be associated with system activity information for semi-structured data and may query for keywords, lines, characters, and strings associated with system activity information for the semi-structured data.

In one implementation, the processing device 120 may store the information in a common format at the database 140. An API 150 may be a set of routines, protocols, and tools that defines how an application may access and use the information in the common format. The application may retrieve the information, per the API 150, from the database 140 and use it to determine a cause of a system error in the computer system 110. In another implementation, the processing device 120 may send the information directly or indirectly to the application.

Figure 2:
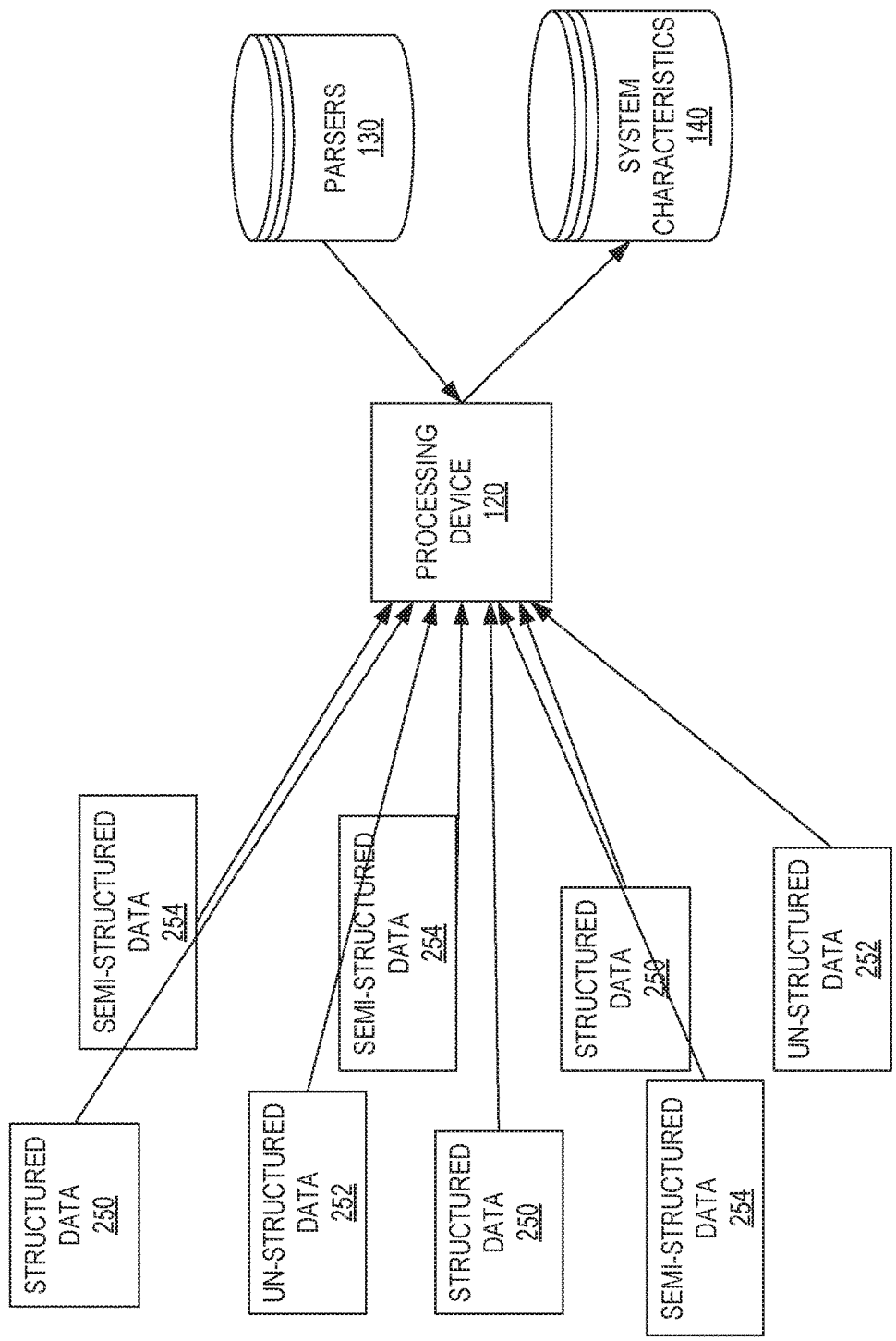
FIG. 2 illustrates a second processing device aggregating structured data, unstructured data, and semi-structured data to generate system characteristics according to one example.

FIG. 2 illustrates the second processing device 120 aggregating information from structured data 250, unstructured data 252, and semi-structured data 254 to generate system characteristics according to one example. Some of the features in FIG. 2 are the same or similar to some of the features in FIG. 1 as noted by the same reference numbers, unless expressly described otherwise. As discussed above, the second processing device 120 may identify a parser to parse and extract information from the structured data 250, unstructured data 252, and semi-structured data 254. In one implementation, the second processing device 120 can extract information from multiple sets of structured data 250, unstructured data 252, and semi-structured data 254. The extracted information may be a portion of the data, such as a portion of a string of information.

The second processing device 120 may aggregate the extracted information and store the information in a common format, as discussed in greater detail below. The second processing device 120 may use different parsers to parse and extract the information from the structured data 250, unstructured data 252, and semi-structured data 254. In one implementation, the second processing device 120 may use a first parser to extract data from the structured data 250, a second parser to extract data from the unstructured data 252, and a third parser to extract data from the semi-structured data 254.

The first set of unstructured data 252, the second set of unstructured data 252, and the third set of unstructured data 252 may have different formats. For example, the first set of unstructured data 252 may include system characteristics, the second set of unstructured data 252 may include system activity information, and the third set of unstructured data 252 may include log information. The second processing device 120 may use a first parser to extract system characteristics from a first set of unstructured data 252, a second parser to extract system activity information from a second set of unstructured data 252, and a third parser to extract log information from a third set of unstructured data 252. The first parser and the second parser might include different rules to identify different keywords or strings to extract different information when the different keywords or strings are identified.

In one implementation, the second processing device 120 may use a first parser for a first type of content and identify a first keyword and associated text surrounding or proximate to the first keyword. The text surrounding the first keyword may be a first amount of words or symbols preceding or succeeding the first keyword. The second processing device 120 may use a second parser for a second type of content and identify a second keyword and associated text surrounding the second keyword. The first keyword and the second keyword may be different keywords. For example, the first parser may use a first list of keywords and the second parser may use a second list of keywords, where the first list of keywords does not include one or more of the keywords included the second list of keywords.

FIG. 3 illustrates a data structure 300 to store information extracted from structured data 250, unstructured data 252, or semi-structured data 254 of FIG. 2 in a common format according to one example. Some of the features in FIG. 3 are the same or similar to some of the features in FIGS. 1 and 2 as noted by the same reference numbers, unless expressly described otherwise. The data structure 300 may include data fields 310-320 designating types of information to store in associated data fields 322-332, respectively. For example, the data field 310 may include an identifier indicating that corresponding data field 322 is designated for storing information indicating a type of CPU in the computing system 110 in FIG. 1. The data field 312 may include an identifier designated that the corresponding data field 324 stores information indicating a number of processing cores in the computing system 110. The data field 314 may include an identifier designated that the corresponding data field 326 stores information indicating a number of hard disks in the computing system 110. The data field 316 may include an identifier designated that the corresponding data field 328 stores information indicating a size of hard disks in the computing system 110. The data field 318 may include an identifier designated that the corresponding data field 330 stores information indicating a type of random access memory (RAM) in the computing system 110. The data field 320 may include an identifier designated that the corresponding data field 332 stores information indicating a size of the RAM in the computing system 110.

The second processing device 120 may identify parsers corresponding to content types of the structured data 250, the unstructured data 252, or the semi-structured data 254 in FIG. 2. The second processing device 120 may use the parsers to extract system characteristics from the structured data 250, the unstructured data 252, or the semi-structured data 254 and store the extracted system characteristics into the data fields 322-332 respectively. For example, the second processing device 120 may identify a parser to extract system characteristics from the unstructured data 252 of the computing system 110. The second processing device 120 may identify that a first system characteristic that was extracted is a type of a CPU in the computing system 110. The second processing device 120 may then store the first system characteristic in the corresponding data field 322.

The second processing device 120 may iteratively extract information from multiple sets of structured data 250, unstructured data 252, or the semi-structured data 254.

The processing device 120 may determine the type of information and store the information in the designated data field. The identifiers in fields 310-320 and the types and order of information stored in corresponding data fields 322-332 may vary and are not intended to be limiting. In one implementation, the data structure 300 may include a field to associate the information with the computing system it was received from. For example, when the processing device 120 receives information from the computing system 110, the processing device 120 may tag the information as being received from the computing system 110. When the processing device 120 stores the information in the data structure 300, the processing device may store the tag.

In one implementation, the data fields 322-332 may be populated with information from multiple parsers. For example, the data field 322 may be populated by information from a first parser associated with a first content type or data file and information from a second parser associated with a second content type or data file. In another implementation, the data field 322 may be populated with information from the first parser associated with a first content type or data file and the data field 324 may be populated with information from the second parser associated with the second content type or data file.

Different parsers may be used to extract info from the same file. For example, a first parser may be used to extract a first type of information in a file and a second parser may be used to extract a second type of information from the same file. In one implementation, the first parser and the second parser may run independent of each other. In another implementation, there may be a logical dependency between the first parser and the second parser. In one example, the processing device 120 may use the first parser to identify a data file as a particular type of file or as including a particular content type. The processing device 120 may use the second parser to extract information from the data file for that particular type of file or content type. In another example, when the processing device 120 cannot identify the type of data file or content type using the first parser, the processing device 120 may not use the second parser that is associated with the type of data file or content type identified by the first parser. In another example, the first parser may identify the type of data file or content type and extract a first set of information and the second parser may extract a second set of information for the type of data file or content type identified by the first parser.

Figure 4:
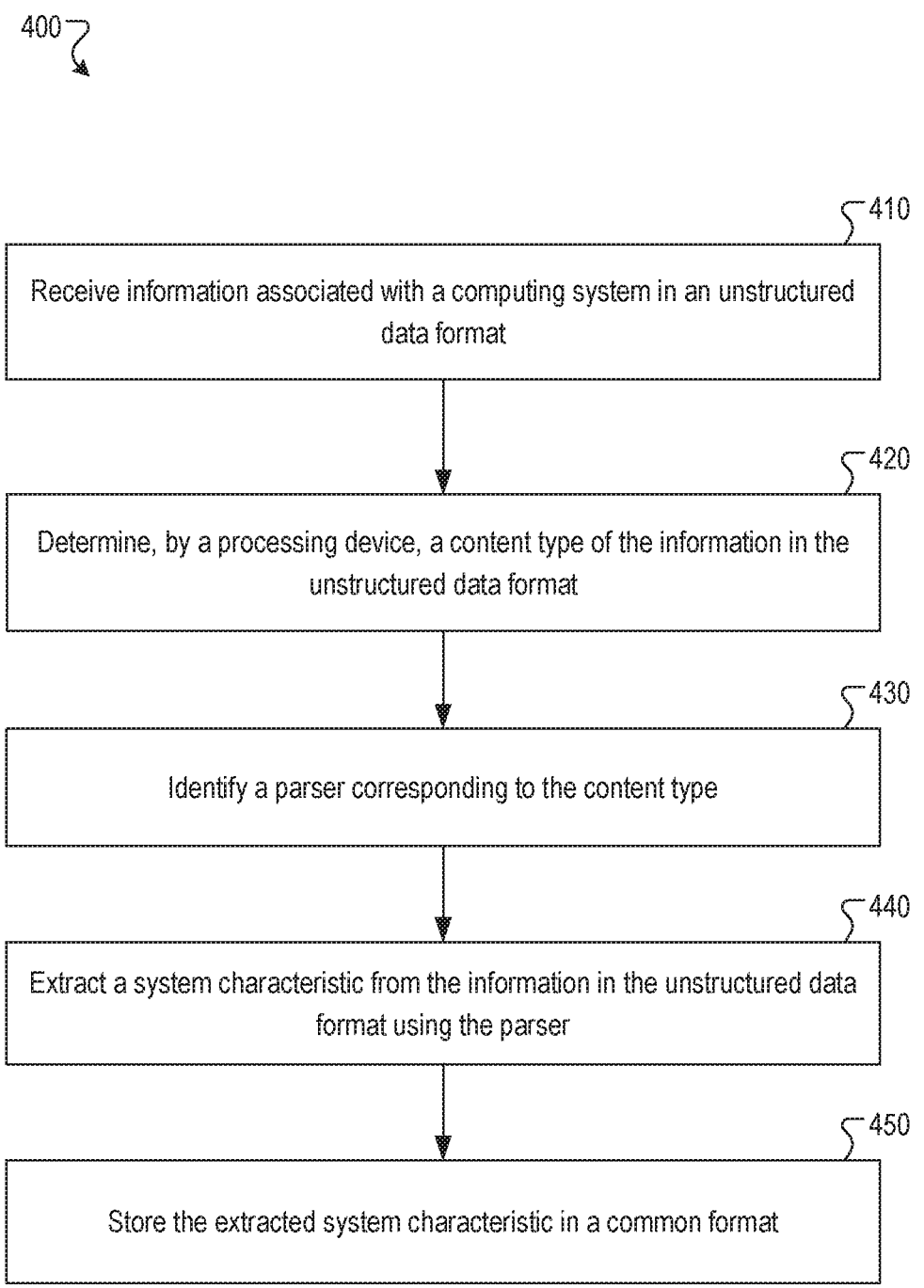
FIG. 4 depicts a flow diagram of one example of a method for extracting system characteristics from unstructured data.

FIG. 4 depicts a flow diagram of one example of a method 400 for extracting system characteristics from unstructured data. The method 400 may be performed by processing logic that may include hardware (circuitry, dedicated logic, etc.), programs (such that is run on a general-purpose computing system or a dedicated machine), or a combination of both. The method 400 may be performed in all or in part by a processing device.

At block 410, a processing device may receive information associated with a computing system in an unstructured data format. At block 420, the processing device may determine a content type of the information in the unstructured data format. For example, the processing device may determine a content type of information in the unstructured data in view of an identifier in the information in the unstructured data format, where the identifier indicates a file path of the information in the unstructured data format in a file system of the computing system. At block 430, the processing device may identify a parser corresponding to the content type. For example, to identify the parser, the processing device is to query the string of information to identify a keyword indicating the content type of the string of information. At block 440, the processing device may extract a system characteristic from the information in the unstructured data format using the parser. The system characteristics may indicate a type of central processing unit (CPU) in the computing system, a number of processing cores in the computing system, a number of hard disks in the computing system, a size of the hard disks in the computing system, a type of random access memory (RAM) in the computing system, or a size of the RAM in the computing system. At block 450, the processing device may store the extracted system characteristic in a common format. The extracted system characteristic may be inserted into a data field associated with the extracted system characteristic.

Figure 5:
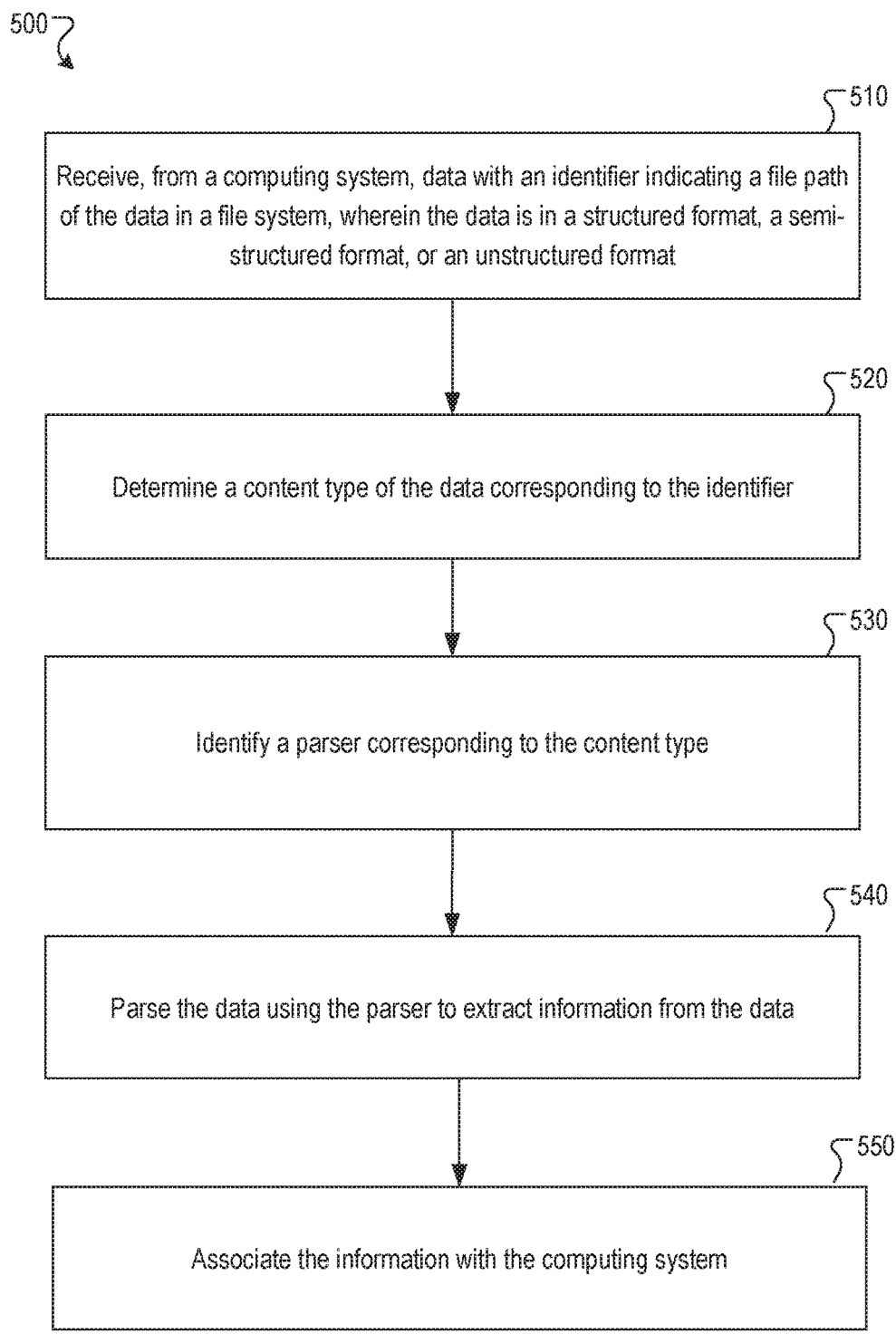
FIG. 5 depicts a flow diagram of one example of a method for parsing data using a parser to extract information from the data.

FIG. 5 depicts a flow diagram of one example of a method 500 for parsing data using a parser to extract information from the data. The method 500 may be performed by processing logic that may include hardware (circuitry, dedicated logic, etc.), programs (such that is run on a general-purpose computing system or a dedicated machine), or a combination of both. The method 500 may be performed in all or in part by a processing device.

At block 510, a processing device may receive, from a computing system, data with an identifier indicating a file path of the data in a file system, where the data is in a structured format, a semi-structured format, or an unstructured format. At block 520, the processing device may determine a content type of the data corresponding to the identifier. For example, the processing device may determine the content type of information in the data in view of an identifier in the data. At block 530, the processing device may identify a parser corresponding to the content type. For example, to identify the parser, the processing device is to query the string of information to identify interface configuration information indicating the content type of the string of information. At block 540, the processing device may parse the data using the parser to extract information from the data. The information may be a system characteristic that indicates a type of CPU in the computing system, a number of processing cores in the computing system, a number of hard disks in the computing system, a size of the hard disks in the computing system, a type of RAM in the computing system, or a size of the RAM in the computing system. At block 550, the processing device may associate the information with the computing system. For example, a unique identifier (UID) may be associated with the computing system. When the processing device stores the information, the processing device may tag the information with the UID.

Figure 6:
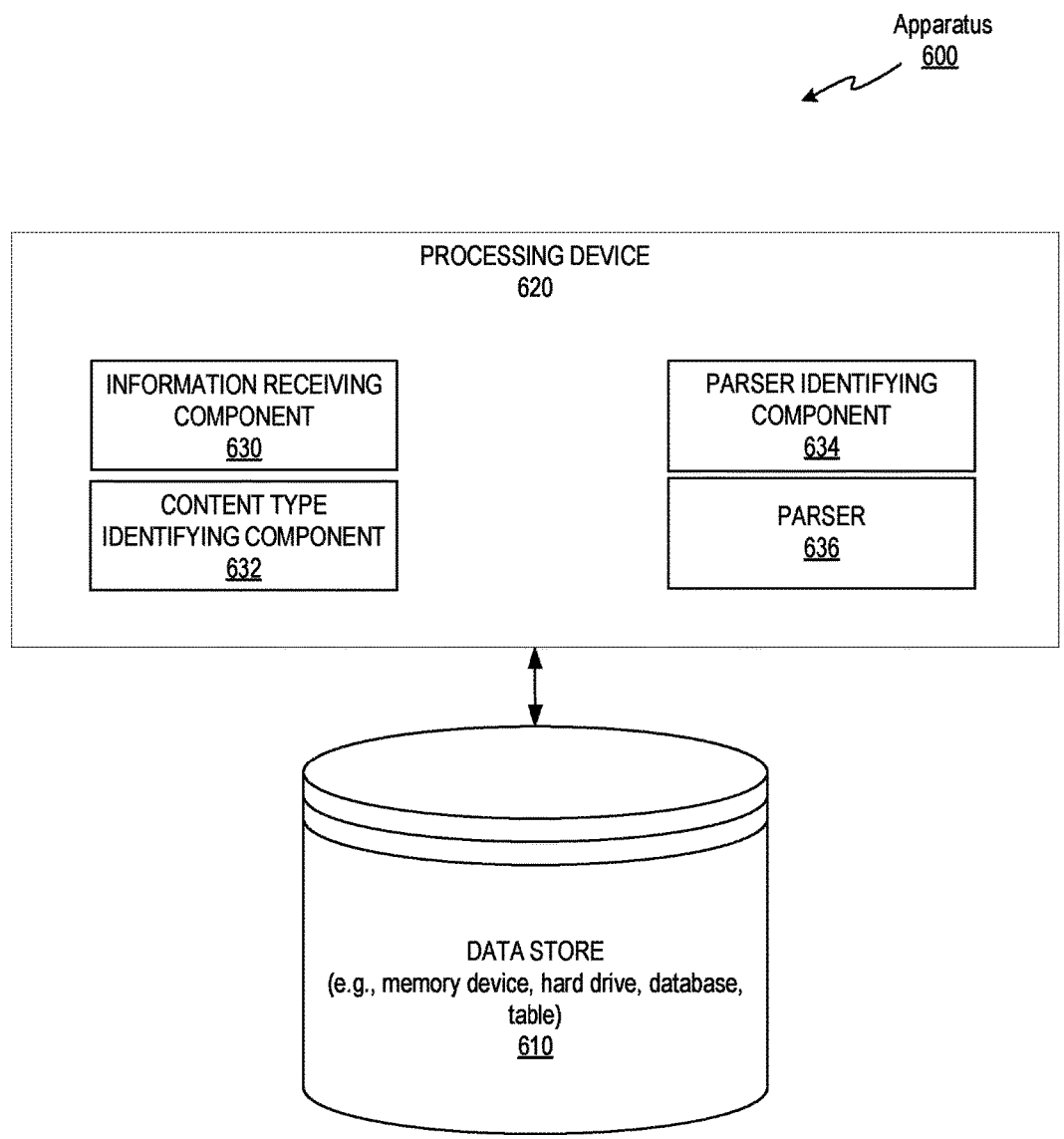
FIG. 6 illustrates an example apparatus in which implementations of the disclosure may operate.

FIG. 6 illustrates an example apparatus 600 in which implementations of the disclosure may operate. The apparatus 600 may be the same or similar to one of the computing system, a network, or other computing devices discussed herein. The data store 610 may include any non-persistent data storage (e.g., memory), persistent data storage (e.g., flash storage, hard drive, tape), another medium, or combination thereof that is capable of storing instructions for carrying out the operations of the components and modules discussed herein. The apparatus 600 may include a data store 610 that may store information (e.g., information extracted from structured data, unstructured data, and semi-structured data).

The apparatus 600 may parse the string of information using the parser to extract a portion of the string of information. The apparatus 600 may include a processing device 620. The processing device 620 may include an information receiving component 630, a content type identifying component 632, a parser identifying component 634, and a parser 636.

The information receiving component 630 may receive a string of information with an identifier indicating a file path of the string of information in a file system. The content type identifying component 632 may determine a content type of the string of information corresponding to the identifier. The parser identifying component 634 may identify a parser corresponding to the content type. The parser 636 may parse the string of information to extract a portion of the string of information and store the portion of the string of information in a common format at a memory device or data store 610. The apparatus 600 may include multiple parsers.

Figure 7:
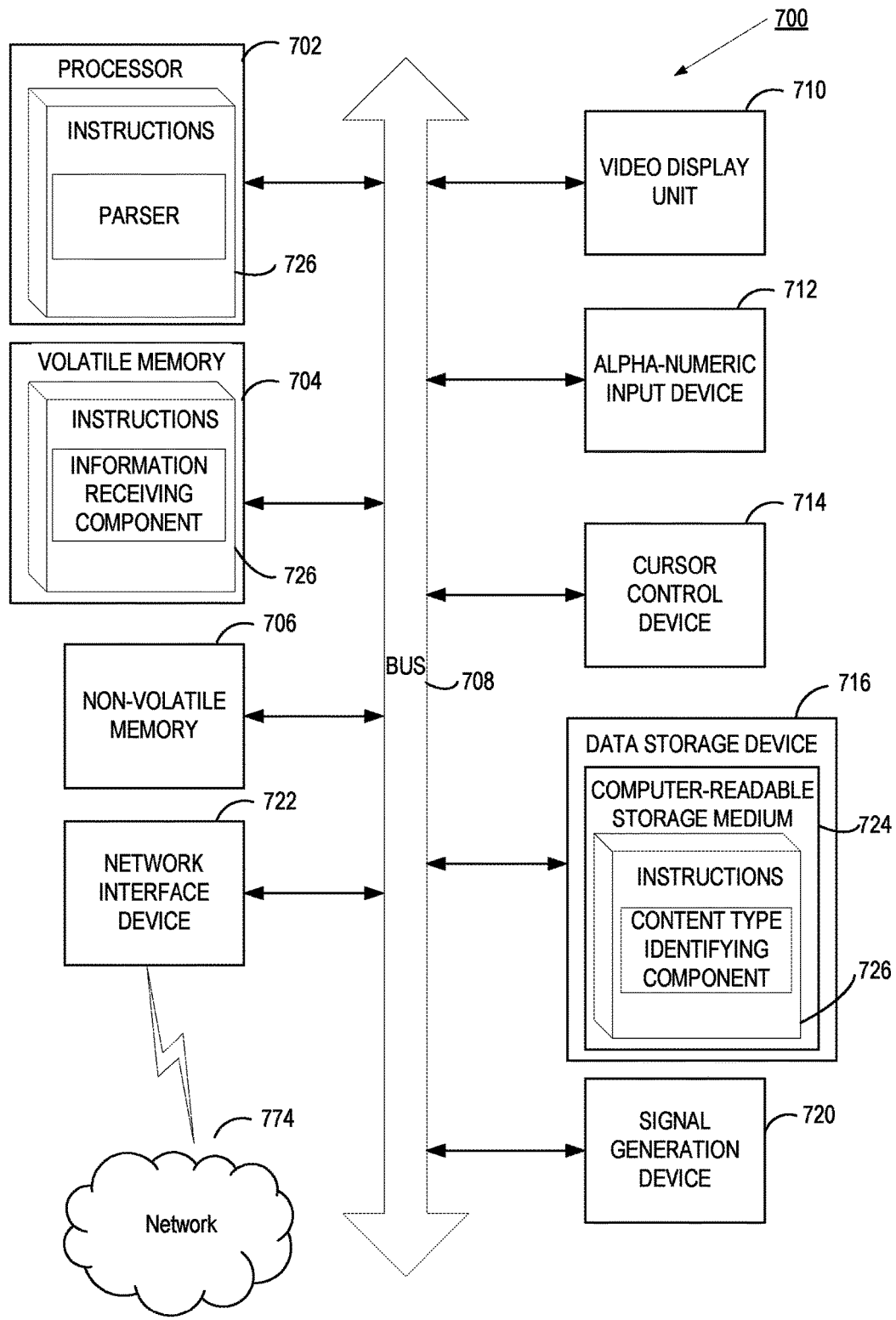
FIG. 7 depicts a block diagram of a computing system operating in accordance with one or more aspects of the present disclosure.

FIG. 7 depicts a block diagram of a computing system operating in accordance with one or more aspects of the present disclosure. In various illustrative examples, computing system 700 may correspond to one or more of the distributed computing system, the network, or other computing devices.

In certain implementations, computing system 700 may be connected (e.g., via a network, such as a Local Area Network (LAN), an intranet, an extranet, or the Internet) to other computing systems. Computing system 700 may operate in the capacity of a server or a client computer in a client-server environment, or as a peer computer in a peer-to-peer or distributed network environment. Computing system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computing system 700 may include a processor 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processor 702 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field-programmable gate array (FPGA), a digital signal processor (DSP), or a network processor).

Computing system 700 may further include a network interface device 722. Computing system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may be stored instructions 726 encoding any one or more of the methods or functions described herein, including instructions for implementing methods 400 and 500.

Instructions 726 may also reside, completely or partially, within volatile memory 704 and/or within processor 702 during execution thereof by computing system 700, hence, volatile memory 704 and processor 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that causes the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated into the functionality of other hardware components such as ASICS, FPGAs, DSPs or similar devices. In addition, the methods, components, and features may be implemented by program modules or functional circuitry within hardware devices. Further, the methods, components, and features may be implemented in any combination of hardware devices and program components, or only in programs.

Unless specifically stated otherwise, terms such as "loading," "transmitting," "receiving," "overwriting," "initiating," "discovering," "analyzing," or the like, refer to actions and processes performed or implemented by computing systems that manipulate and transform data represented as physical (electronic) quantities within the computing system registers and memories into other data similarly represented as physical quantities within the computing system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computing system selectively programmed by a program stored in the computing system. Such a program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 400, and 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, from a computing system, information in an unstructured data format, wherein at least a portion of the information in the unstructured data format is generated by the computing system;
determining, by a processing device, a content type of the information in the unstructured data format;
in response to determining a first content type:
identifying a first parser corresponding to the first content type, wherein the first parser is identified in view of configuration interface information of the information in the unstructured data format indicating the first content type, and wherein the first parser is to identify one or more data fields in the information for the first content type; and
extracting a system characteristic from the information in the unstructured data format using the first parser;
in response to determining a second content type:
identifying a second parser corresponding to the second content type, wherein the second parser is identified in view of configuration interface information of the information in the unstructured data format indicating the second content type, and wherein the second parser is different than the first parser and is to identify one or more data fields in the information for the second content type; and
extracting system activity information from the information in the unstructured data format; and
storing the system characteristic of the first content type and the system activity information of the second content type in a common format, wherein the common format comprises one or more data fields associated with the system characteristic and the system activity information.

2. The method of claim 1, wherein determining the content type of the information in the unstructured data format comprises:
  determining the content type of the information in the unstructured data format in view of an identifier in the information in the unstructured data format, wherein the identifier indicates a file path of the information in the unstructured data format in a file system.

3. The method of claim 1, wherein determining the content type of the information in the unstructured data format further comprises:
  determining a file path of the information in the unstructured data format in a file system; and
  identifying a keyword in the file path associated with the content type.

4. The method of claim 1, wherein determining the content type of the information in the unstructured data format further comprises:
  parsing the unstructured data to extract a keyword; and
  identifying the content type in view of the keyword.

5. The method of claim 1, wherein storing the system characteristic further comprises:
  determining a type of the system characteristic; and
  storing the system characteristic in a data field of a database, the data field being designated for the type of the system characteristic.

6. The method of claim 1, wherein the information in the unstructured data format is system configuration information for the computing system, log information for the computing system, or the system activity information for the computing system.

7. The method of claim 1, further comprising storing the system characteristic in a data field already storing information extracted from another parser.

8. The method of claim 1, wherein the first parser comprises a rule to identify a keyword and to extract information proximate to the keyword.

9. An apparatus comprising:
  a memory; and
  a processing device, operatively coupled with the memory, to:
    receive, from a computing system, a string of information with an identifier indicating a file path of the string of information in a file system, wherein at least a portion of the string of information is generated by the computing system;
    determine a content type of the string of information corresponding to the identifier;
    in response to determining a first content type:
      identify a first parser corresponding to the first content type, wherein the first parser is identified in view of configuration interface information of the string of information indicating the first content type, and wherein the first parser is to identify one or more data fields in the information for the first content type; and
      parse the string of information using the first parser to extract a first portion of the string of information;
    in response to determining a second content type:
      identify a second parser corresponding to the second content type, wherein the second parser is identified in view of configuration interface information of the string of information indicating the second content type, and wherein the second parser is different than the first parser and is to identify one or more data fields in the information for the second content type; and
      parse the string of information using the second parser to extract a second portion of the string of information; and
    store the first portion and the second portion of the string of information in a common format, wherein the common format comprises one or more data fields associated with the first portion and one or more data fields associated with the second portion of the string of information.

10. The apparatus of claim 9, wherein the string of information is in a structured format, a semi-structured format, or an unstructured format.

11. The apparatus of claim 9, wherein to parse the string of information, the processing device is further to:
  query the string of information to identify a keyword in the string of information; and
  extract the first portion of the string of information that includes the keyword.

12. The apparatus of claim 9, wherein the processing device is further to generate a data structure comprising a data field designated for a type of the first portion of the string of information.

13. The apparatus of claim 9, wherein to identify the first parser and the second parser, the processing device is further to:
  query the string of information to identify a keyword indicating the content type of the string of information; or
  query the string of information to identify interface configuration information indicating the content type of the string of information.

14. The apparatus of claim 13, wherein the keyword indicates that the string of information is received from a particular hardware component of a computing system.

15. The apparatus of claim 13, wherein the string of information comprises at least one of system configuration information for the computing system, log information for the computing system, or system activity information for the computing system.

16. A non-transitory computer-readable storage medium, having instructions stored therein, which when executed, cause a processing device to:
  receive, from a computing system, data with an identifier indicating a file path of the data in a file system, wherein the data is in a structured format, a semi-structured format, or an unstructured format, wherein at least a portion of the data is generated by the computing system;
  determine a content type of the data;
  in response to determining a first content type:
    identify a first parser corresponding to the first content type, wherein the first parser is identified in view of configuration interface information of the information in the unstructured format indicating the first content type, and wherein the first parser is to identify one or more data fields in the data for the first content type; and
    parse the data using the first parser to extract first information from the data;
  in response to determining a second content type:
    identify a second parser corresponding to the second content type, wherein the second parser is identified in view of configuration interface information of the information in the unstructured format indicating the second content type, and wherein the second parser is different than the first parser and is to identify one or more data fields in the data for the second content type; and parse the data using the second parser to extract second information from the data; and associate the first information and the second information with the computing system by storing the first information and the second information in a common format, wherein the common format comprises one or more data fields associated with the first information and the second information.

17. The non-transitory computer-readable storage medium of claim 16, wherein the processing device is to:

generate a database with a common data structure for data in the structured format, the unstructured format, or the semi-structured format; and store the first information and the second information in the database.

18. The non-transitory computer-readable storage medium of claim 16, wherein the data is a case attachment for the computing system with a system error.

19. The non-transitory computer-readable storage medium of claim 18, wherein the processing device is to send the first information and the second information in a common format to an application, the application to determine a cause of the system error.

20. The non-transitory computer-readable storage medium of claim 16, wherein the data comprises at least one of system configuration information for the computing system, log information for the computing system, or system activity information for the computing system.

21. The method of claim 1, wherein the first parser comprises a rule to identify a first keyword and to extract information proximate to the first keyword, and wherein the second parser comprises a rule to identify a second keyword and to extract information proximate to the second keyword.

22. The apparatus of claim 9, wherein to parse the string of information, the processing device is further to:

query the string of information to identify a first keyword in the string of information;

extract the first portion of the string of information that includes the first keyword;

query the string of information to identify a second keyword in the string of information; and extract the second portion of the string of information that includes the second keyword.

* * * * *